United States Patent
Pontieri

(10) Patent No.: US 7,297,049 B2
(45) Date of Patent: Nov. 20, 2007

(54) SANDING ROPE AND APPLICATIONS THEREOF

(76) Inventor: James M. Pontieri, 36291 Jared, Sterling Heights, MI (US) 48312

( * ) Notice: Subject to any disclaimer, the term of this patent is extended or adjusted under 35 U.S.C. 154(b) by 0 days.

(21) Appl. No.: 11/595,392

(22) Filed: Nov. 10, 2006

(65) Prior Publication Data

US 2007/0077875 A1    Apr. 5, 2007

Related U.S. Application Data

(60) Division of application No. 11/133,529, filed on May 20, 2005, now Pat. No. 7,144,314, which is a continuation-in-part of application No. 10/860,694, filed on Jun. 3, 2004, now Pat. No. 6,997,794.

(51) Int. Cl.
*B24D 15/00*    (2006.01)

(52) U.S. Cl. ................... 451/523; 451/913; 451/533

(58) Field of Classification Search ............... 451/259, 451/484, 486, 493, 495, 513, 514, 533, 534, 451/524, 525, 913

See application file for complete search history.

(56) References Cited

U.S. PATENT DOCUMENTS

| | | |
|---|---|---|
| 2,024,591 A | 12/1935 | Manchester |
| 2,094,894 A | 10/1937 | Johnson |
| 2,465,569 A | 3/1949 | Bates |
| 2,853,838 A | 9/1958 | Richards |
| 3,364,630 A | 1/1968 | Rusk et al. |
| 3,557,496 A | 1/1971 | Martin |
| 3,638,367 A * | 2/1972 | Dreger ................ 451/524 |
| 3,640,031 A | 2/1972 | Descant |
| 3,722,150 A | 3/1973 | Pass |
| 4,249,349 A | 2/1981 | Rueb |
| 4,464,836 A * | 8/1984 | Hissa ..................... 30/92 |
| 4,501,096 A | 2/1985 | Lukianoff |
| 4,694,618 A * | 9/1987 | Eberhart et al. ........ 451/524 |
| 4,887,396 A | 12/1989 | Lukianoff |
| 5,203,123 A | 4/1993 | Travis |
| 5,220,752 A | 6/1993 | Cheney et al. |
| 5,309,681 A | 5/1994 | Cheney et al. |
| 5,419,087 A | 5/1995 | Haddy |
| 5,651,728 A | 7/1997 | Stanzione |
| 6,503,612 B1 | 1/2003 | Copeland |
| 2002/0090902 A1 | 7/2002 | Draper |

(Continued)

*Primary Examiner*—Dung Van Nguyen
(74) *Attorney, Agent, or Firm*—J. Gordon Lewis

(57) ABSTRACT

A disposable sanding device is fabricated as a continuous rope-like article which is adapted for selective segmentation and application as a plurality of serially arranged disposable hand sanding devices or ropes. Each hand sanding device is formed as a generally elongated rod shaped base portion formed of lightweight material such as closed cellfoam having a relatively constant cross-section along its line of elongation. An abrasive surface is permanently applied to the external surface of the base portion via an intermediate adhesive layer. As constructed, the sanding device is operable to conform to curvilinear contours of a work piece to be sanded upon application of user induced loading against the work piece. A dispenser holds a rolled length of sanding rope and includes a cutter feature for severing pieces of sanding rope from the coil as required as well as a retainer for the free end of the coil. A tensioning hand tool holds a severed length of sanding rope for precise applications. Interconnection means is provided to concentrically position and affix opposed ends of a base portion segment.

9 Claims, 9 Drawing Sheets

U.S. PATENT DOCUMENTS

2002/0173258 A1  11/2002  Biddle et al.
2003/0060150 A1   3/2003  Spears
2003/0104777 A1   6/2003  Deshler

* cited by examiner

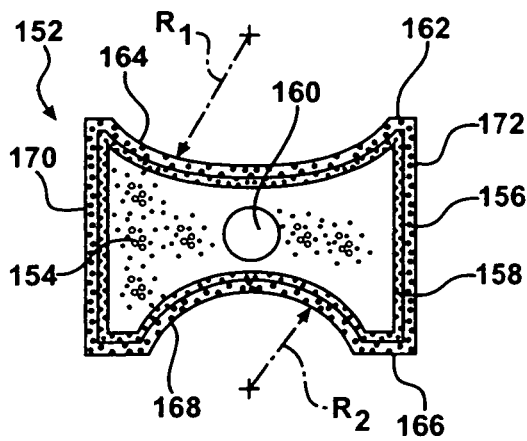
FIG - 9
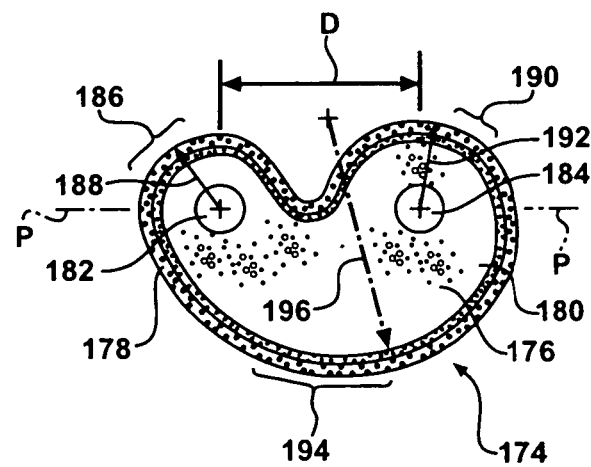
FIG - 10
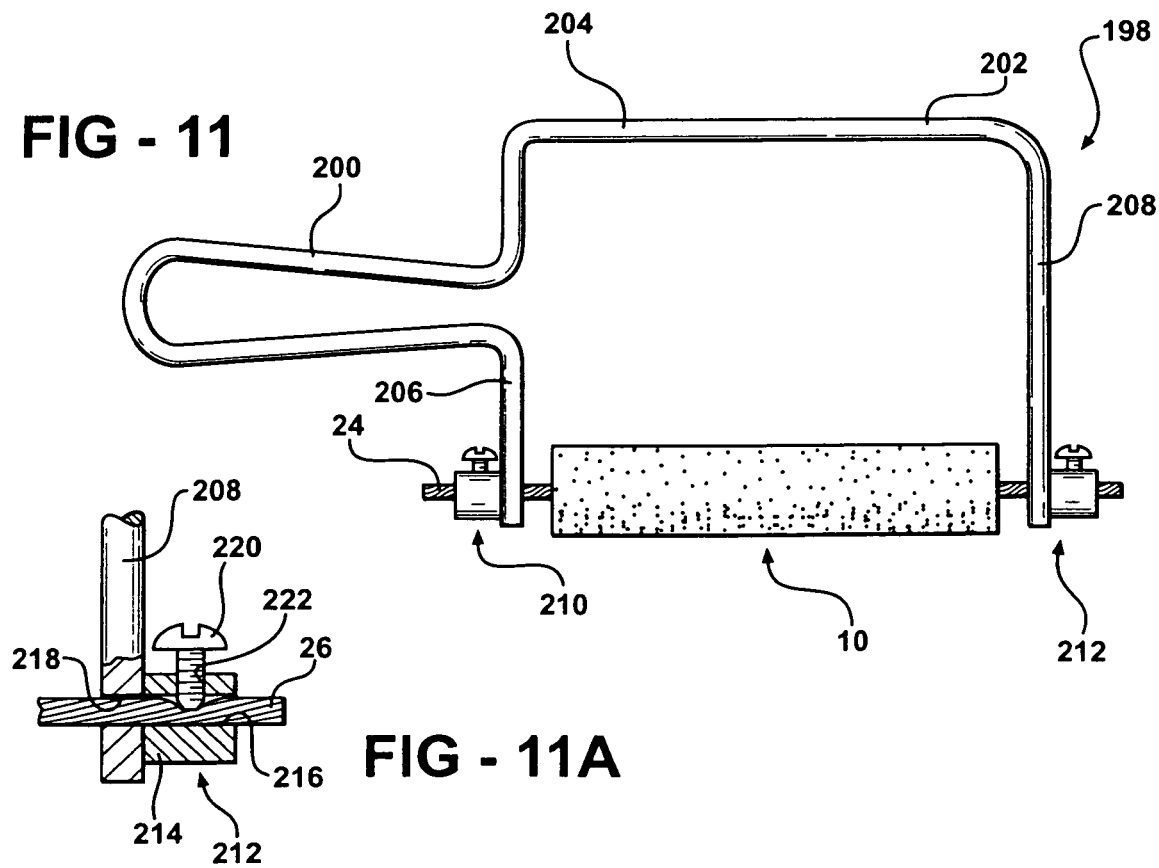
FIG - 11
FIG - 11A

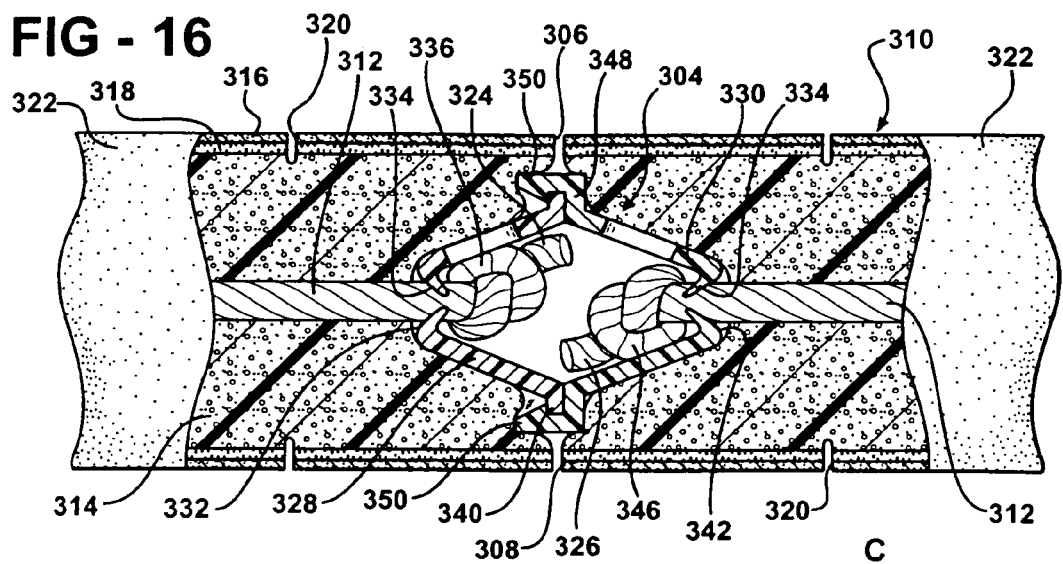
FIG - 16
FIG - 17
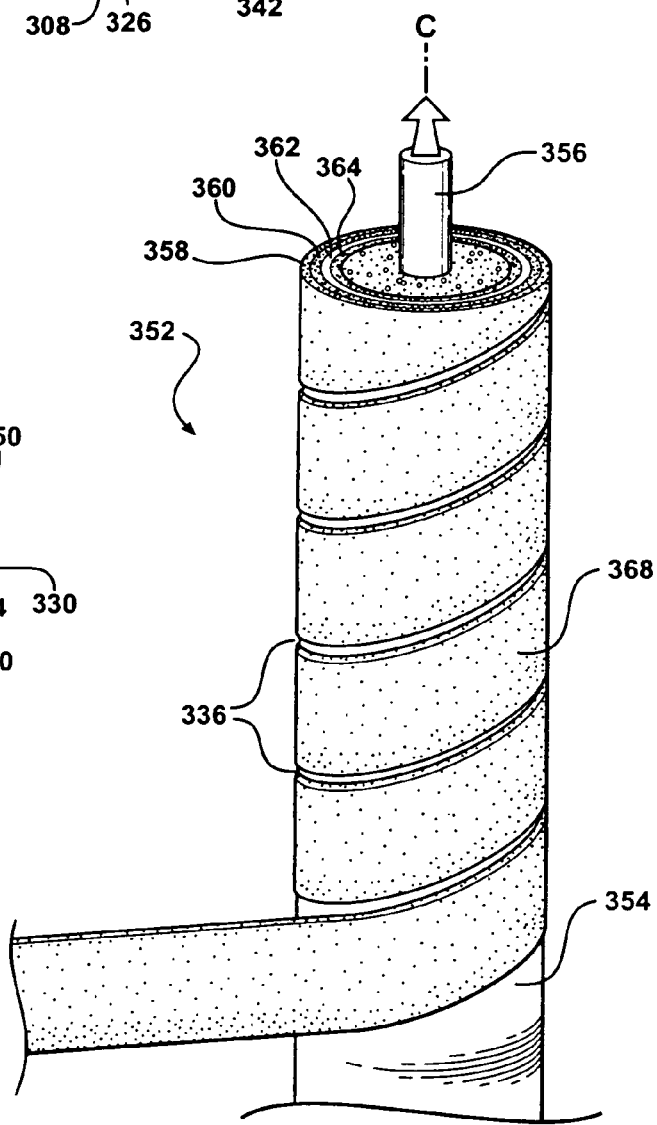
**FIG - 18

SANDING ROPE AND APPLICATIONS THEREOF

RELATED PATENT APPLICATION

This application is a divisional an application entitled "Sanding Rope and Applications Thereof", U.S. Ser. No. 11/133,529, filed 20 May 2005, now U.S. Pat. No. 7,144,314 B2, issued 5 Dec. 2006, which is a continuation-in-part of a parent application entitled "Sanding Rope and Method of Forming Same", U.S. Ser. No. 10/860,694, filed 3 Jun. 2004, now U.S. Pat. No. 6,997,794 B2, issued 14 Feb. 2006, and owned by the common inventor/applicant.

The present invention relates generally to hand tools and particularly to sanding devices, especially for use in wood working. More particularly still, the present invention relates to a low cost, hand-held disposable sanding device which can be easily manipulated by hand for sanding and finishing a wide variety of work piece surface shapes and configurations.

BACKGROUND OF THE INVENTION

Small sanding jobs and sanding jobs calling for considerable detail work or access to small confined areas will usually require the direct hand application of sandpaper of one or more suitable grit sizes. The difficulty in hand-sanding is in applying firm pressure long enough to complete the job and in applying even pressure to obtain a desired smooth and even finish. A further difficulty is to obtain efficient use of the sandpaper by not wasting any substantial portion of its surface area.

Common sanding jobs calling for considerable detail work or access to small confined areas, or for the sanding of contoured surfaces, will often require that the surfaces be hand sanded. Therefore, hand-held sanding devices devised for this purpose consist essentially of a sanding block for holding conventional sandpaper wrapped over the block. By using a sanding block as a sandpaper holder, hand-applied sanding forces on the sandpaper can be increased and more evenly distributed. One such device is disclosed in U.S. Pat. No. 4,501,096 to Lukianoff, wherein a generally triangularly shaped sandpaper holding device provides three different sanding surfaces and corners for accommodating a variety of sanding conditions. The sandpaper wrapped around the faces of this device is held at its ends by means of an angled slot located in one of its faces.

The difficulty with the above-mentioned prior sanding devices is the necessity of installing or wrapping a separate piece of sandpaper around the device. This installation or wrapping process presents some inconvenience to the user, and the paper, if improperly installed, is susceptible to falling off. Also, the device requires the purchase of separate sheets of sandpaper which is a further inconvenience in terms of the amount of supplies needed.

Sanding blocks are presently available in a variety of forms in an attempt to meet the needs of those who must sand various surfaces. Perhaps the most common sandpaper support is a block of wood from which one may move through myriad supports and into complex electric sanders. In virtually all of these items, the general purpose of the sanding block is three fold.

First, it allows the user to apply greater pressure to the area being sanded. Secondly, it moves the user's hand away from the work surface, usually by providing a handle for the user to grasp, in order to reduce the likelihood of injuries. Thirdly, when a sanding block having a flat sanding paper supporting surface is used to sand a flat surface, the block reduces points of excessive pressure by more evenly distributing the user's force over the sandpaper supporting surface. However, when non-flat surfaces need to be sanded, difficulties often arise. The standard sanding block has a relatively large, flat sandpaper supporting surface which does not satisfactorily meet the needs of one who is sanding an irregular surface. The use of such a sanding block on an irregular surface will generally result in the user angling the block or using it in a way in which it was not intended in an attempt to conform the sanding surface to the work surface. Even with such attempts, the resultant effect is uneven sanding as generally no portion of the block will conform exactly to the area being sanded and excessive areas of pressure which will result in over sanding.

Excessive pressure points can also result in the quickened wearing of the sandpaper, such that the sanding block itself may become exposed, which, depending upon the fabrication of the sanding block, may damage the work surface. Similarly, as the user angles the sanding block in order to utilize a corner or edge of the sandpaper, a portion of the block not covered by the sandpaper may scratch the work surface.

In an attempt to provide sanding blocks which are usable on irregular surfaces, a wide variety of devices have been developed. For example, U.S. Pat. No. 3,557,496 to R.W. Martin discloses a metal strap to which a piece of sandpaper may be secured. The strap is then placed over a pipe or other circular type object so that a back and forth motion may be applied to sand the item. A circular piece of sandpaper is also secured over the handles which are particularly adapted for sanding the inner edges of the pipes. Other patents disclose devices such as special sandpaper holders for louver doors, U.S. Pat. No. 3,640,031 to Descant; sanding fittings, U.S. Pat. No. 3,722,150 to Pass; abrading corners and crevices as shown in U.S. Pat. No. 2,465,569 issued to Bates. While such devices may be suitable for their intended uses, they do not sufficiently meet the myriad surface irregularities often encountered when sanding a complex work piece.

Thus, an individual faced with the task of sanding a variety of irregular surfaces, must either attempt to use different types of sanding blocks, many of which still will not conform to the actual intended use, or in the alternative, those experienced in this area will use their hand in order to conform and support the sandpaper to the work piece. Attempting to enhance this latter approach are devices which either secure the sandpaper directly to the users hand or to a specialized glove.

It should be easily appreciated that these later approaches, while at times effective, are not reasonable alternatives when extreme precision or small detailed contours, such as in furniture finishing, are involved.

The present invention overcomes the forgoing difficulties of hand-held sanding devices by providing a hand-sized sanding device which eliminates the need for a separate sheet of sandpaper. A sanding device is particularly provided which has its own integral abrasive surfaces and which can be manufactured at a sufficiently low cost to be disposable. The invention further provides a self-contained sanding device that can be conveniently used off-the-shelf to hand sand a variety of standard, contoured or shaped surfaces, such as trim or molding surfaces, and for projecting into restricted exactly defined areas.

BRIEF DESCRIPTION OF THE INVENTION

An object of the present invention is to develop a low cost (and thus disposable) hand held sanding device made of lightweight, resilient material capable of recovering its shape after being subjected to radial or axial pressures attendant its usage as a sanding device. The device has a contoured outer surface which can be deformed to match the small, intricate shapes of furniture balusters, moldings and trim. While shaped molding and trim are specifically identified as possible contoured shapes to which the sanding device of the invention can be applied, it shall be understood that the contoured surface of the device can be applied with almost any sandable surface and material.

According to the present invention, a disposable hand sanding device includes an elongated, generally rod shaped base portion which is constructed of lightweight resilient material such as closed cell foam or rubber and is formed with a substantially constant cross-section along its characteristic line of elongation. An abrasive outer surface layer is permanently formed on the base portion by adhering abrasive material such as silicon carbide or aluminum oxide upon an intermediate adhesive layer. This arrangement results in a hand held device which, in application, conforms to curvilinear contours of a work piece to be sanded upon application of user induced loading against the workpiece. The device is light weight, easy to use and is extremely inexpensive to manufacture.

As an additional feature, an elongated, non-resilient flexible cord is embedded within the base portion and extends substantially concentrically with the base portion to limit axial distension of the sanding device upon application of user induced loading. The cord, when exposed, also facilitates manual manipulation of the sanding device.

In the preferred embodiment of the invention, a continuously formed rope-like article is provided which can be selectively cut to length for a specific sanding application. The rope-like article is maintained in a roll. Segments removed from the roll are used and then discarded. This arrangement has the advantage of continuously forming multiple "sanding ropes" in series or a succession such as by extrusion. An artisan can easily maintain the unused roll portion and sever just the length segment required for a specific sanding application.

A dispenser can also be provided which maintains the continuously formed rope-like article in a rotating spool mounted on a frame member which includes a cutter and a loose end holder. This arrangement provides an extremely convenient package which facilitates removal of a length of sanding rope material from the storage roll without the necessity of using additional tools, such as a cutting device.

An additional feature includes witness marks located on the outer surface of the rope-like material which are axially spaced from one another to serve as an indicator or measurement to the artisan in selecting an appropriate amount of length of material to sever. Furthermore, localized weakened areas such as perforations are provided to assist in the stripping off of a short length of base portion to expose an under laying length of inner cord to aid in the manipulation of the severed piece.

A severed length of sanding rope with its internal cord exposed at each end thereof can be employed with a hand held tool, similar to a key hole saw frame, which provides precisely controlled tensioning of the cord in application to a work piece.

These and other features and advantages of this invention will become apparent upon reading the following specification which, along with the drawings, describes and discloses preferred and alternative embodiments of the invention in detail.

BRIEF DESCRIPTION OF THE DRAWINGS

FIG. 9, is a cross-sectional view of still another alternative embodiment of the present invention;

FIG. 10, is a cross-section view of yet still another alternative embodiment of the present invention;

FIG. 11, is a plan view of a tool for facilitating use of the hand sanding device of FIG. 1;

FIG. 11A, is a depiction of a portion of the tool for facilitating use of the hand sanding device of FIG. 11, on an enlarged scale;

FIG. 16, is a side partial cross-sectional view of an alternative connector system for forming a length of the segmented sanding device into a closed loop;

FIG. 17, is an end view of the connector system of FIG. 16 separated from its associated sanding device;

FIG. 18, is a broken perspective view of another alternative embodiment of the invention illustrating a segmented sanding device produced in a continuous chain;

DETAILED DESCRIPTION

Figure 1:
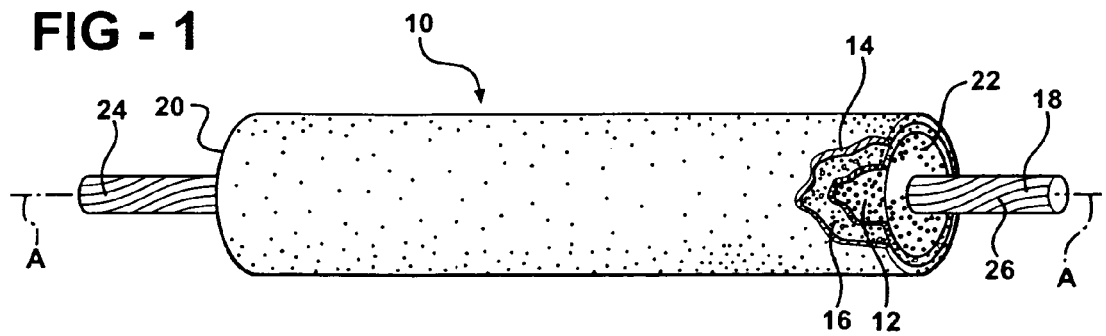
FIG. 1, is a perspective view of a disposable hand sanding device in accordance with the-invention with a portion broken away to reveal internal structural elements thereof.

FIG. 1 illustrates a preferred embodiment of the present invention. A disposable sanding rope or device 10 is formed as a generally rod shaped base portion 12 elongated along an axis designated A-A. Base portion 12 is preferably formed from lightweight resilient material such as closed cell foam or rubber. It is contemplated that many other suitable materials such as urethane or neoprene could be substituted, however, based upon an understanding of the present invention and a given specific application.

The outer circumferential surface of base portion 12 is substantially covered with an abrasive coating layer 11 suitably affixed to the underlying base portion 12 by an intermediate adhesive layer 16. Adhesive layer 16 is spray applied to base portion 12 prior to application of a suitable aggregate abrasive 14 such as coarse aluminum oxide or silicon carbide. Such materials are commercially available from the Household and Hardware Products Division of the 3M Company under a number of product names. One type of spray adhesive that can be used is "Spray Mount" No. 6065 produced by 3M Adhesives Division of the 3M Company. This construction allows momentary resilient deformation of the sanding rope 10 as it engages a work piece. Upon completion of the sanding process, the sanding rope returns to its illustrated shape. Alternatively, abrasive layer 14 could be formed of traditional sand paper which is, in turn, adhered to base portion 12 by adhesive layer 16.

A reinforcing cord 18, formed of woven fibrous material such as cotton or nylon, extends along axis A-A within base portion 12 of sanding rope 10. Cord 18 is flexible in the radial direction and inflexible in the axial direction and thus serves to limit axial distension of sanding rope 10 when applied against a work piece. Furthermore, cord 18 also extends axially beyond the longitudinal ends 20 and 22 of base portion 12 to define grip handles 24 and 26.

Sanding rope 10 is intended for hand sanding complex curvilinear surfaces of work pieces such as wooden furniture or moldings. Rope 10 is employed by either grasping the abrasive layer by the user's finger tips or palm of the hand and applying force against a work piece. In this manner the tactile sense of the operator's hand allows continuous variation in force applied against the work piece and thus the rate and configuration of sanding. This is useful for non-symmetrical or custom surface features.

Alternately, for work piece surfaces which are regular or symmetrical in at least one plane, grip handles 24 and 26 can be held by the fingertips of the user's respective right and left hands. Insodoing, the user tensions cord 18 along axis A-A. The user then positions the abrasive surface 14 of rope 10 against a specific feature of the work piece to be sanded and alternatively pulls grip handles 24 and 26 along axis A-A. This action will largely conform the local circumferential shape of the sanding rope 10 to the adjacent contour features of the work piece. As grip handles 24 and 26 are alternatively pulled in one direction and then another along axis A-A, the portion of abrasive layer 14 of sanding rope 10 contacting the work piece reshapes its surface. The amount of tension applied along the cord 18 will control the degree in which the abrasive layer will conform to the work piece.

For example, if very little tension is applied to cord 18, the sanding rope 10 will tend to increase its "wrap" or engagement with convex surface features of the work piece. Conversely, if the cord 18 is placed under high tension, sanding rope 10 will tend to decrease its "wrap" around convex surfaces. Accordingly, an amount of user experience and test sanding of material similar to that contained in an intended work piece will facilitate skilled use of the present invention.

Figure 2:
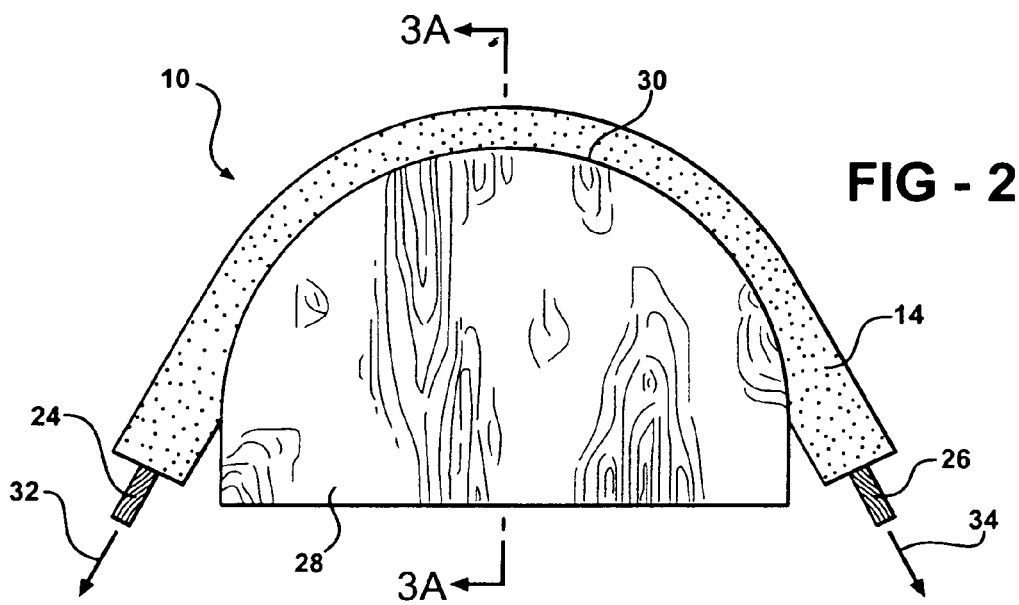
FIG. 2, is a front plan view of the hand sanding device of FIG. 1 in application of forming, sanding or shaping a work piece.

Referring to FIG. 2, sanding rope 10 is illustrated in application with a work piece 28. The work piece 28 is of relatively simple geometric form for purposes of illustration only, it being contemplated that the present invention is best applied with extremely irregular contoured surfaces. The work piece 28 is configured as a generally rectangular block of wood having an upper surface 30 with a generally rounded configuration. Sanding rope 10 is applied by draping it over upper surface 30 with cord 18 extending generally from left to right. Grip handles 24 and 26 are alternatively pulled leftwardly, as illustrated by arrow 32, and then rightwardly, as illustrated by arrow 34. As described hereinabove, the user will maintain continuous tension in cord 16 throughout this process.

Figure 3A:
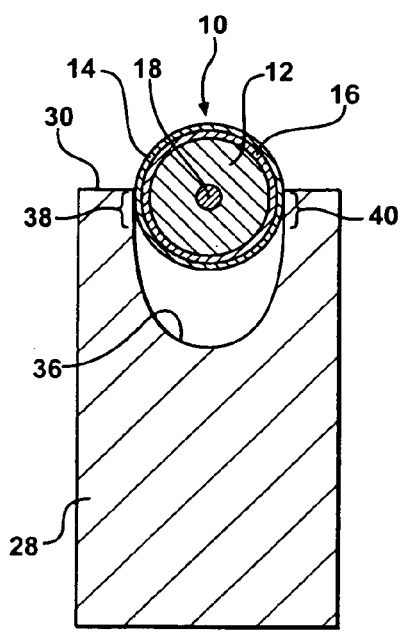
FIG. 3A, is a cross-section, taken on lines 3A-3A of FIG. 2.

Referring to FIGS. 2 and 3A, sanding rope 10 is being employed to form a generally saddle or crescent shaped groove 36 in upper surface 30 of work piece 28. When subjected to very low tension forces in the direction of arrows 32 and 34, the base portion 12 of sanding rope 10 substantially maintains its nominal circular configuration. As such, only a small portion of the abrasive layer 14 adjacent the intersection of the uppermost portion of groove 36 and upper surface 30 conforms to the adjacent portion of the groove 36 at regions designated 38 and 40. Therefore, axial manipulation of sanding rope 10 will result in removal of material at regions 38 and 40.

Figure 3B:
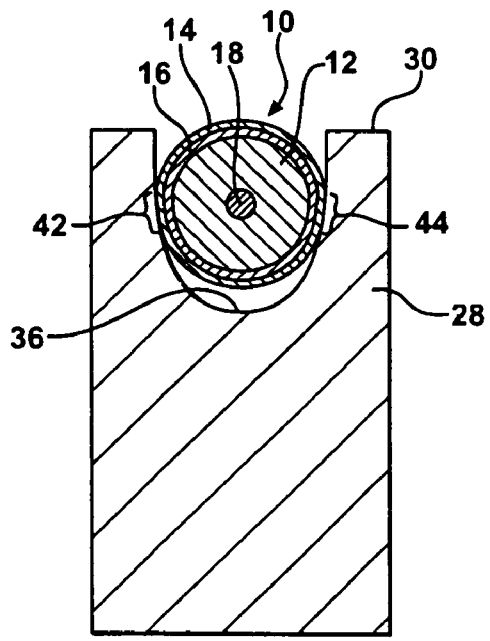
FIG. 3B, is a cross-section, taken on lines 3A-3A of FIG. 2, with the sanding device in an alternate orientation with respect to the work piece.

Referring to FIGS. 2 and 3B, sanding rope 10 is illustrated as being subjected to intermediate tension forces in the direction of arrows 32 and 34. As a result, sanding rope is displaced further within groove 36 and conforms thereto at adjacent regions designated 42 and 44. Again, axial manipulation of sanding rope 10 will result in removal of material at regions 42 and 44.

Figure 3C:
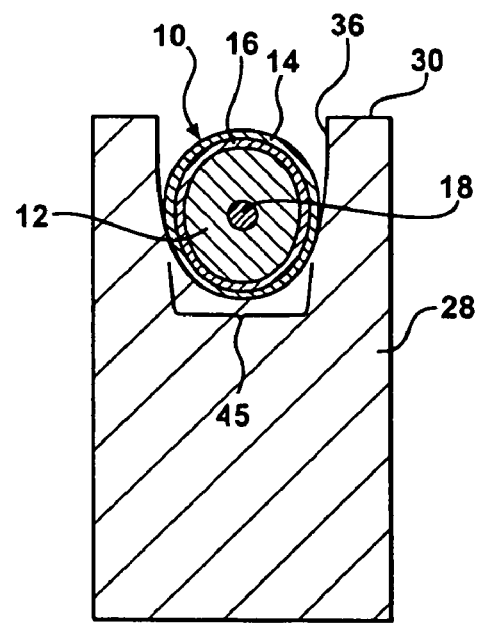
FIG. 3C, is a cross-section, taken on lines II-II of FIG. 2, with the sanding device in another alternate orientation with respect to the work piece.

Referring to FIGS. 2 and 3C, sanding rope 10 is illustrated as being subjected to relatively high tension forces in the direction of arrows 32 and 33. As a result, sanding rope 10 is displaced into the bottom of groove 36 and conforms thereto at a single adjacent region 45. Axial manipulation of sanding rope 10 will result in removal of material at region 45.

The various positionings of sanding rope 10 in FIGS. 3A, 3B and 3C serve to illustrate how an artisan using sanding rope 10 can skillfully and precisely remove material from a complex recess in a work piece by varying the tension applied to the cord 18 of sanding rope 10. Varying the positioning of the sanding rope 10 vis-a-vis the groove 36 causes momentary localized deformation of the base portion 12 and the abrasive coating layer 14 as well as the intermediate adhesive layer 16. Upon removal of the sanding rope 10 from engagement with the work piece 28, the overall shape of the sanding rope 10 will return to the generally cylindrical configuration illustrated in FIG. 1.

Figure 4:
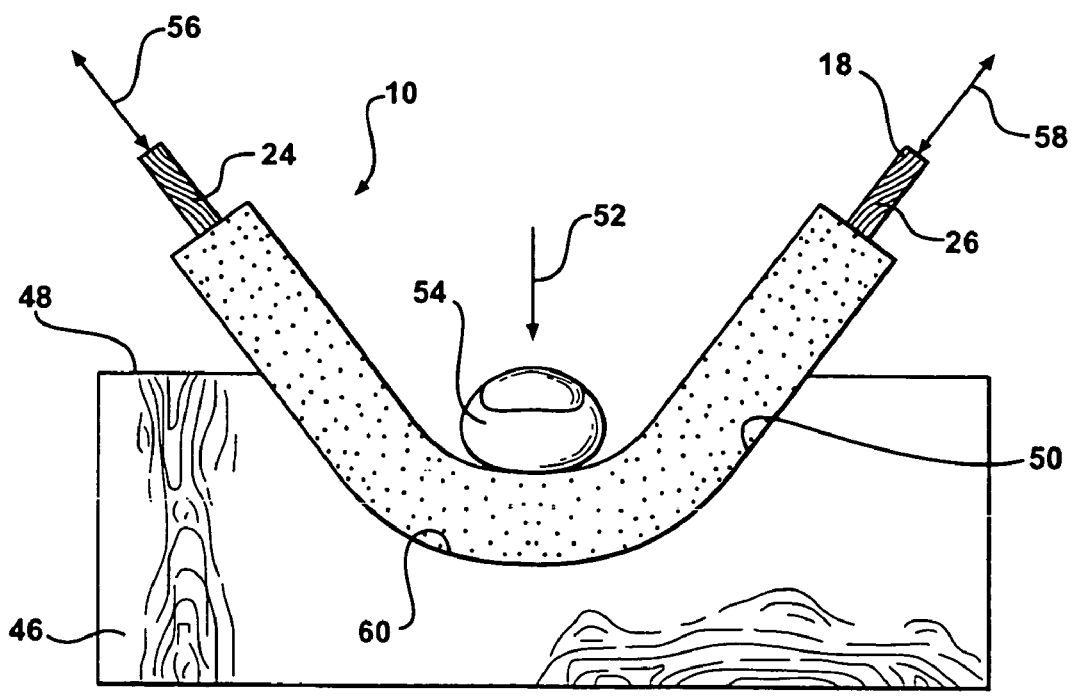
FIG. 4, is a front plan view of the hand sanding device of FIG. 1 in application of forming another work piece.

Referring to FIG. 4, an alternative application of the sanding rope 10 described in connection with FIG. 1 is illustrated. Sanding rope 10 is illustrated in FIG. 4 in application with a work piece 46. As in the case of work piece 28 described in connection with FIG. 2, work piece 46 is of relatively simple geometric form for purposes of illustration only, it being contemplated that the present invention is best applied with extremely irregular contoured surfaces. The work piece 46 is configured as a generally rectangular block of wood having an upper surface 48 with a generally concave feature 50 formed therein. Sanding rope 10 is applied to work piece 46 by conforming it generally to the contours of concave feature 50 on upper surface 48 of work piece 46. Sanding rope is maintained in its illustrated position by the artisan applying pressure, as indicated by arrow 52, from one or more finger tips 54. While holding sanding rope 10 in position, the artisan would apply his other hand to grasp either of the grip handles 24 or 26 and apply tension to cord 18, as illustrated by arrows 56 and 58, respectively. Increasing or decreasing pressure (arrow 52) will deform the base portion 12 of sanding rope 10 and thus increase or decrease the amount of abrasive layer that is bearing against the adjacent area 60 of concave feature 50. This will result in precisely controlled removal of material at region 60 in response to axial manipulation of sanding rope 10.

Figure 5:
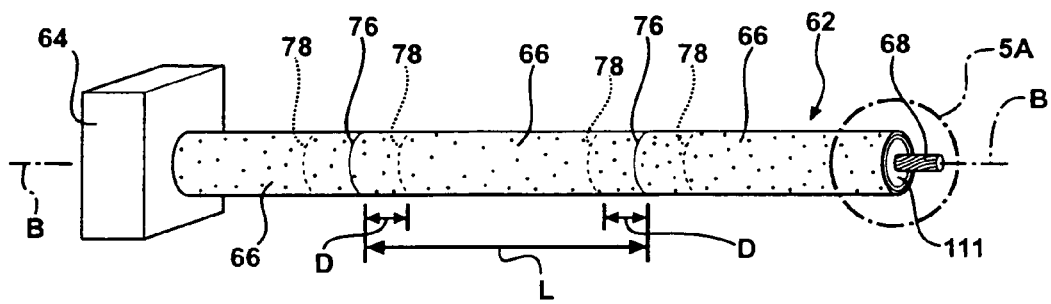
FIG. 5, is a broken perspective view of a continuous chain of disposable hand sanding devices.
Figure 5A:
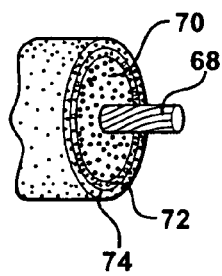
FIG. 5A, is a depiction of the end of the continuous chain of disposable hand sanding devices of FIG. 5, on an enlarged scale.

Referring to FIGS. 5 and 5A, to facilitate economical large scale production of sanding rope 10 such as illustrated in FIG. 1, it would be formed in an endless or continuous stream 62 emerging from appropriate manufacturing equipment 64, such as an extruder, along an axis B-B. The continuous stream 62 of sanding rope preferably has a typical cross section configuration substantially identical to that described with respect to the sanding rope 10 segment of FIG. 1. The continuous stream 62 comprises successive segments of sanding rope 66 joined end-to-end along axis B-B.

The continuous stream 62 structure consists of concentrically arranged cord 68, base portion 70, adhesive layer 72 and abrasive coating layer 74. Witness marks 76 are imprinted on the outer surface of abrasive coating layer 74 at axially spaced locations there along. Weakened areas 78 such as perforations are formed at axially spaced locations as well. The witness marks are indicators of suggested locations for severing one specific sanding rope segment 66 from an immediately adjacent segment 66. The applicant has discovered that spacing (designated "L") between successive witness marks of eight (8") to twelve (12") inches results in sanding rope segments 66 of convenient length for many craft and hobby applications.

Perforations 78 are provided at a location spaced from each end of each sanding rope segment 66. The perforations extend inwardly through abrasive coating layer 74, adhesive layer 72 and substantially all of base portion 70. The cord 68 is not weakened, however. The portions of the abrasive layer 74, adhesive layer 72 and base portion 70 intermediate the (severed) witness marks 76 and a related perforation 78 are optionally removable to expose a segment of the underlying cord 68. The applicant has discovered that the exposed cord 68 portion, i.e. the spacing (designated "D") between each witness mark 76 and its associated perforations 78 of one (1") to two (2") inches results in a convenient length of exposed cord 68 for finger grasping by the artisan in application of a given sanding rope segment 66 without undue waste of material.

Figure 6:
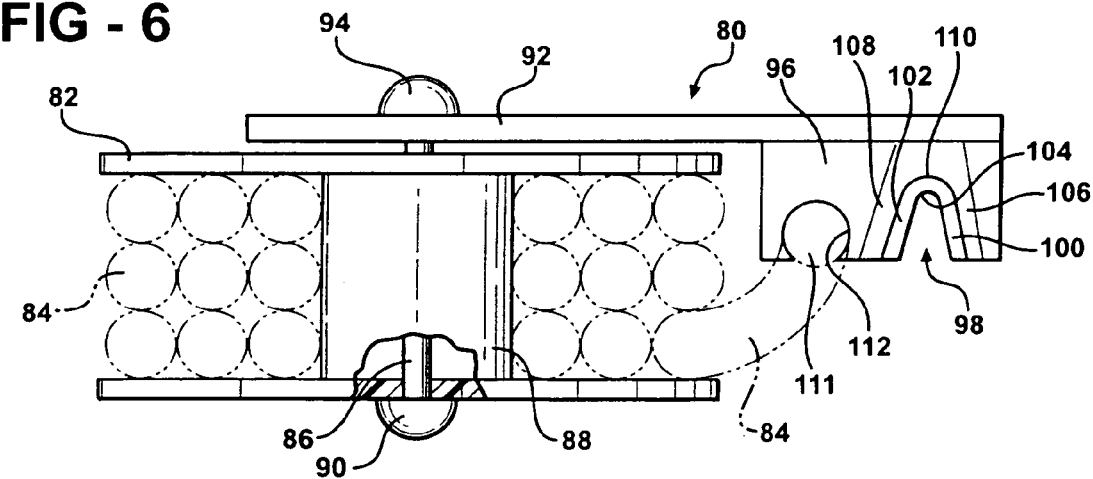
FIG. 6, is a top plan view of a dispenser of the continuous chain of disposable hand sanding devices of FIG. 5.

When constructed in a continuous stream 62, the sanding rope segments 66 of the present invention can be easily packaged and marketed in bulk or rolls. Referring to FIG. 6, an example roll dispenser 80 for retail sales of a substantial length (such as 10' to 25') is illustrated. A spool 82 dimensioned to receive and hold an extended length of sanding rope 84 (shown in phantom) is mounted for rotation on an axle 86 extending concentrically through the hub 88 of spool 82. The lower end of axle 86 is affixed to a stop member 90 which functions to prevent relative upward displacement of the axle 86 with respect to hub 88 but allow free relative rotation between the two. Axle 86 extends upwardly above spool 88 and through a frame member 92, terminating in a second stop member 94. Stop member 94 is affixed to both the uppermost end of axle 86 and frame member 92, and prevents relative downward displacement of the axle 86 with respect to hub 88. Thus, frame 92, axle 86, and stop members 90 and 94 comprise one rigid, fixed assembly. Spool 82 (and any sanding rope 84 carried thereon) is free to rotate about axle 86 but is restrained from relative axial displacement with respect to the remainder of roll dispenser 80.

Frame member 92 of roll dispenser 80 extends radially outwardly beyond spool 82 and terminates in a cutter/retainer portion 96. Cutter/retainer portion 96 serves as an integrated tool for conveniently severing one or more sanding rope segments 66 (see FIG. 5) as required. Subsequently, the free end 111 of the extended length of sanding rope 84 remaining on spool 82 is retained in its illustrated position to prevent inadvertent uncoiling of the extended length of sanding rope 84 remaining on the spool 82. Cutter/retainer portion defines a generally "V" shaped cutter 98 defining converging sharpened edges 100 and 102. A pocket 104 formed in the cutter 98 adjacent the point of closest approach of edges 100 and 102 is dimensioned to receive the cord 68 of a sanding rope segment 66 being severed from the remaining length of sanding rope 84 remaining on the spool 82. Thickened guide walls 106.108 and 110 coact with cutting edges 100, 102 and pocket 101, respectively, to precisely guide the segment of sanding rope 66 being severed to ensure a clean perpendicular cut occurs. Cutter/retainer portion 96 also defines a necked opening 112 dimensioned to enable the user to press fit the free end 111 of the extended length of sanding rope 84 remaining on the spool 82 during storage.

Figure 7:
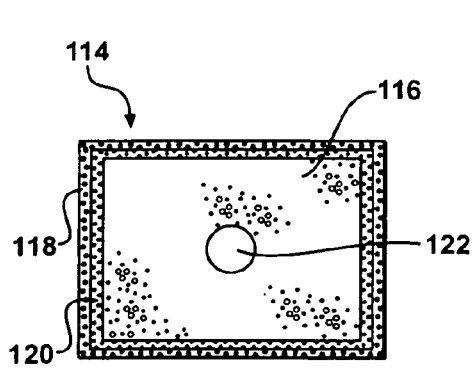
FIG. 7, is a cross-sectional view of an alternative embodiment of the present invention.

Referring to FIG. 7, an alternative configuration of the sanding rope 10 described with reference to FIG. 1, is illustrated. A sanding rope 114, illustrated in typical cross-section, comprises a base portion 116.formed in a generally square or rectangular configuration. The outer circumferential surface of base portion 116 is substantially covered by an abrasive coating layer 118 which is affixed to the base portion 116 by an intermediate adhesive layer 120. A reinforcing cord 122, formed of woven fibrous material extends axially through the base portion 116. The sanding rope 114 provides multiple flat normally disposed surfaces and intermediate sharp corners suitable for certain sanding requirements.

Figure 8:
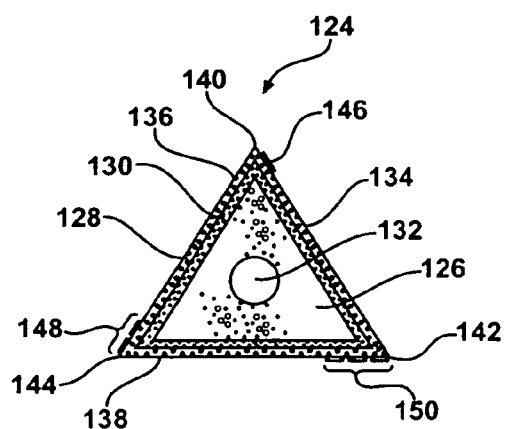
FIG. 8, is a cross-sectional view of another alternative embodiment of the present invention.

Referring to FIG. 8, another alternative configuration of the sanding rope described with reference to FIG. 1, is illustrated. A sanding rope 124, illustrated in typical cross-section, comprises a base portion 126 formed in a generally triangular configuration. The outer circumferential surface of base portion 126 is substantially covered by an abrasive coating layer 128 which is fixed to the base portion 126 by an intermediate adhesive layer 130. A reinforcing cord 132 formed of woven fibrous material extends axially through the base portion 126. The sanding rope 126 provides three acutely angled flat surfaces 134, 136 and 138 intersected by intermediate corner edges 140, 142 and 144. Each surface 134, 136 and 138 has a significantly different grit size or coarseness characteristic. Furthermore, each surface 134, 136 and 138 carries unique visible or tactile indicia indicative of its relative degree of coarseness.

In the case of this embodiment of the invention, the indicia comprise single, dual and treble sets of axially extending brightly colored stripes 146, 148 and 150. Alternatively, numerical grit or coarseness ratings could be provided on each side surface 134, 136 and 138 as an aid to the artisan.

Referring to FIG. 9, still another alternative embodiment configuration of the sanding rope described with reference to FIG. 1. is illustrated. A sanding rope 152, illustrated in typical cross-section, comprises a base portion 154 formed in a generally hour glass configuration. The outer circumferential surface of base portion 154 is substantially covered by an abrasive coating layer 156 which is fixed to the base portion 154 by an intermediate adhesive layer 158. A reinforcing cord 160 formed of woven fibrous material extends axially through the base portion 154. The top surface 162 of sanding rope 152 has an axially extending concave recess 164 formed therein. Recess 164 has a characteristic relatively constant radius designated by arrow "R1". Likewise, the bottom surface 166 of sanding rope 152 has an axially extending concave recess 168 formed therein. Recess 168 has a characteristic relatively constant radius designated by arrow "R2". It is contemplated that R1 and R2 may be dimensionally the same or, alternatively, substantially varied. Side walls 170 and 172 of sanding rope 152 are illustrated as being substantially flat. However, they could be formed as concave, convex or otherwise curvilinear surfaces to suit any number of varied sanding jobs.

Referring to FIG. 10, a further alternative embodiment configuration of the sanding rope described with reference to FIG. 1, is illustrated. A sanding rope 174. illustrated in typical cross-section. comprises a base portion 176 having an exterior surface which is continuously curvilinear in shape. The outer circumferential surface of base portion 176 is substantially covered by an abrasive coating layer 178 which is fixed to the base portion 176 by an intermediate adhesive layer 180. Two reinforcing cords 182 and 184 formed of woven fibrous material extend axially through the base portion 176. Cords 182 and 184 are parallel and fall upon an imaginary plane designated "P-P". Sanding rope 174 is asymmetrical in overall shape to define convexly curved surfaces of varying radius. Specifically, the upper left hand portion of base portion 176 defines a region 186 of relatively small varying radius designated by arrow 188. The upper right hand portion of base portion 176 defines a region 190 of intermediate varying radius designated by arrow 192. The bottom portion of base portion 176 defines a region 194 of relatively large varying radius designated by arrow 196. Cord 182 extends through the portion of base portion 176 adjacent region 186 and cord 184 extends through the portion of base portion 176 adjacent region 190. Cords 182 and 184 provide enhanced control of sanding rope 174 when regions 186 and 190, respectively, are being employed in a sanding operation.

When both cords 182 and 184 are subjected to tensioning by an artisan in application, sanding rope becomes relatively inflexible within plane P-P, thus proving another measure of control.

Referring to FIGS. 11 and 11A, a tensioning tool 198 suitable for use with the sanding rope 10 described in connection with FIG. 1, is illustrated. Tool 198 can be applied in circumstances where extremely precise control of sanding rope 10 is required to effect sanding of a workpiece with curvilinear features having section which is straight in at least one direction.

Tensioning tool 198 is similar in some cosmetic respects to a conventional key-hole saw. Tool 198 is formed from relatively stiff drawn steel wire that is square or round in cross-section. The wire is bent to form a handle portion 200 integrally formed with a generally "U" shaped bow frame 202. Bow frame 202 consists of a base portion 204 and two legs 206 and 208 extending there from in cantilever fashion. Legs 206 and 208 extend downwardly, terminating in sanding rope clamping assemblies 210 and 212, respectively.

Clamping assemblies 210 and 212 are substantially identical. Accordingly, the detailed structure of only one will be described herein for the sake of brevity. Clamp assembly 212 includes an annular ring 214 defining a through bore 216. Through bore 216 of ring 214 registers with a similarly dimensioned and aligned through bore 218 formed in leg 208 near the free end thereof. Legs 206 and 208 are generally parallel and are spaced to receive the sanding rope 10 described in connection with FIG. 1. In application, grip handle or cord segment 26 of sanding rope 10 is threaded rightwardly through bores 218 and 216, extending slightly there beyond. A set screw 220 which is threadably engaged within a bore 222 in ring 214 normal to and communicating with bore 216, is then tightened to secure grip handle 26 in its illustrated position. The process is then repeated wherein grip handle 24 is secured to leg 206 via clamp assembly 210. As a final step, the free ends of legs 206 and 208 are momentarily forcibly sprung towards one another. Set screw 220 is loosened and grip handles 24 and 26 are pulled in opposed directions (tensioned). Finally, set screw 220 is retightened. This arrangement results in bow portion 202 of tool 198 acting to maintain a predetermined level of tension in sanding rope 10. Thereafter, sanding rope is employed in its intended manner by the artisan grasping and manipulating the tool 198 by its handle 200.

Figure 12:
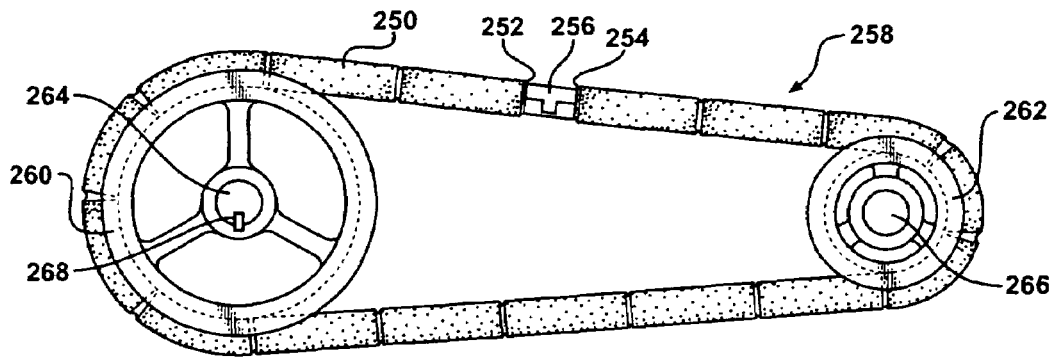
FIG. 12, is a plan view of an alternative embodiment of the present invention employing a segmented disposable sanding device configured in an endless loop and carried on a spaced pulley system.

Referring to FIG. 12, an extended length of a sanding device or sanding rope 250 has first and second opposed ends 252 and 254, respectively, interconnected by a fastener 256 to form a continuous loop, shown generally at 258. Except as denoted herein below, the sanding rope 250 is constructed substantially as described herein above with respect to the embodiments of the invention illustrated in FIGS. 1-5. In one embodiment, the fastener 256 releasably engages the ends 252 and 254 of sanding rope 250, whereby loop 258 can be easily adjusted, reconfigured, repaired or replaced as required. As will become apparent herein below, fastener 256 also serves to precisely axially align ends 252 and 254.

Loop 258 is dressed over two spaced pulleys 260 and 262 carried for rotation upon axles 264 and 266, respectively, which, in turn, are carried by appropriate bearing assemblies and support structure (not illustrated). A tensioner (not illustrated) can be provided to prevent slack within loop 258. Axle 264 is fixed for rotation with pulley 260 by an interlocking key 268.

Loop 258 can be rotated (with pulleys 260 and 262) either manually by a hand crank (not illustrated) or by a motorized mechanism such as an electric motor (not illustrated). The embodiment illustrated in FIG. 12 is intended for low speed, low force applications and provides a fixed radius zone for sanding tangent to the o.d. of each of the pulleys 260 and 262. The pulleys 260 and 262 can be of the same or differing diameters as required by a particular application.

Figure 13:
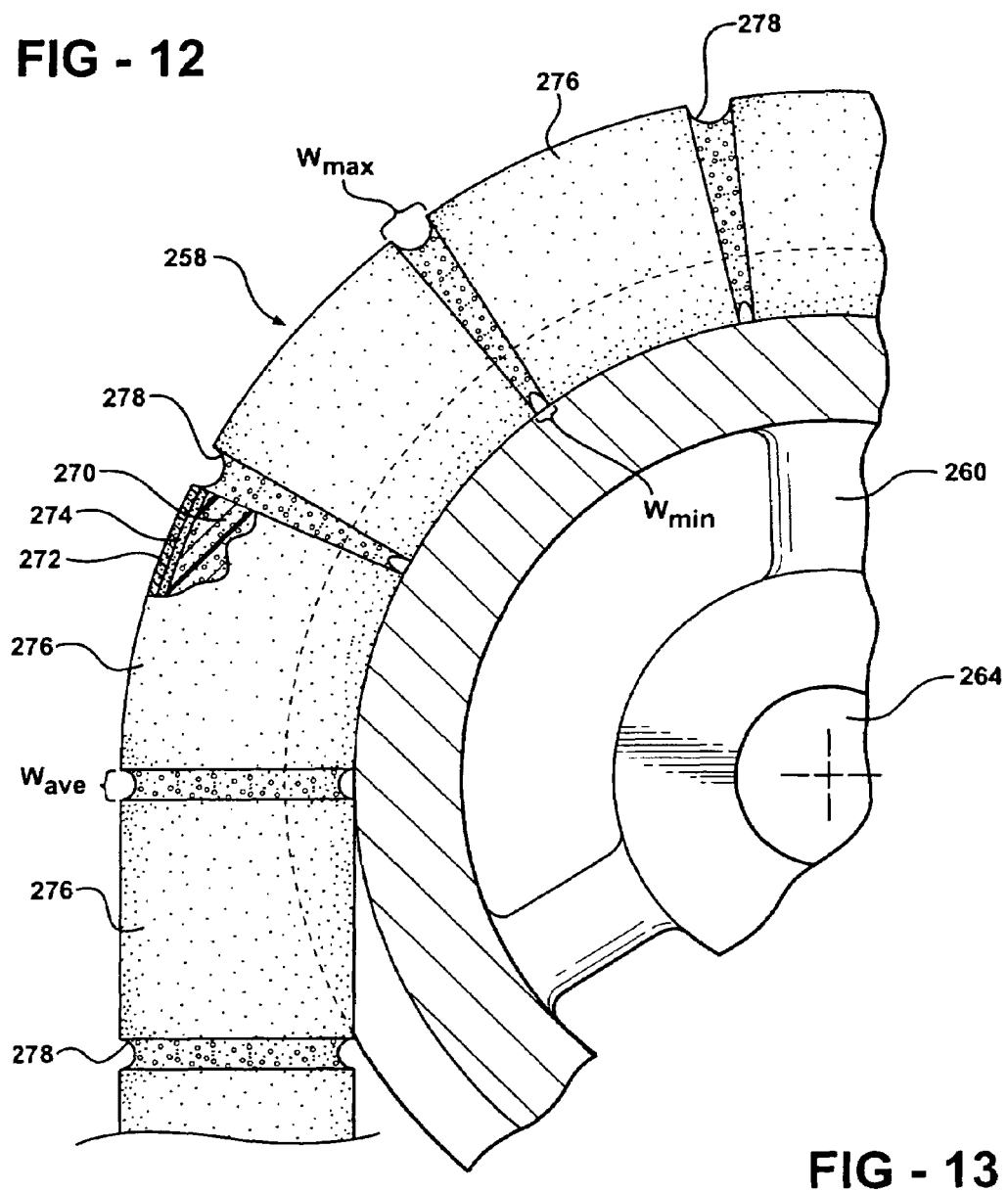
FIG. 13, is a broken, partially cross-sectional plan view of the embodiment of FIG. 12, on an enlarged scale.

Referring to FIG. 13, a broken, sectioned portion of pulley 260 with an overlaying segment of sanding rope 250 is illustrated. As described herein above, sanding rope 250 is constructed with a soft, foam-like generally rod shaped base portion 270, which is substantially of constant cross-section along its axial line of elongation. An abrasive outer coating or layer 272 is applied to the outer peripheral surface of base portion 270 by an intermediate adhesive layer 274. The abrasive layer 272 covers substantially the entire circumferential surface of the sanding rope 250.

Sanding rope 258 is divided into a plurality of discrete abrasive surface regions 276 separated by outwardly opening annular recesses or neck regions 278. The abrasive surface regions 276 and intermediate neck regions 278 form a repeating pattern to facilitate usage of the sanding rope 250, as well as inexpensive manufacturing by simple extrusion process. Such construction materially adds to the overall flexibility of the sanding rope 250, allowing it to be draped over work pieces or pulleys of relatively small diameter without concern for deformation of the abrasive layer 272. This aspect of the invention permits sanding of extremely intricate workpiece features. Preferably, the axial length of the individual abrasive regions 276 and recesses/necks remain constant. The specific dimensions of the abrasive surface regions 276 are selected as a function of the diameter of the sanding rope 250 as well as the intended application, material to be sanded, rate of sanding, and the like. The axial dimension of the neck regions are preferably kept to a minimum, but must be able to adapt to the minimum sanding radius contemplated for the specific application.

To maximize overall flexibility of sanding rope 250, neck regions 278 extend radially through abrasive layer 272 and adhesive layer 274, exposing the relatively softer base portion 270. In the relaxed condition wherein successive abrasive surface regions 276 are in axial alignment, the average circumferential width (W-ave.) remains substantially constant. When sanding rope 250 is dressed over a pulley or workpiece, the outer portion of each neck region 278 is locally distended under tension to momentarily assume a maximum axial dimension (W-max.). Simultaneously, the inner portion of each neck region 278 is locally compressed to momentarily assume a minimum axial dimension (W-min.).

Figure 14:
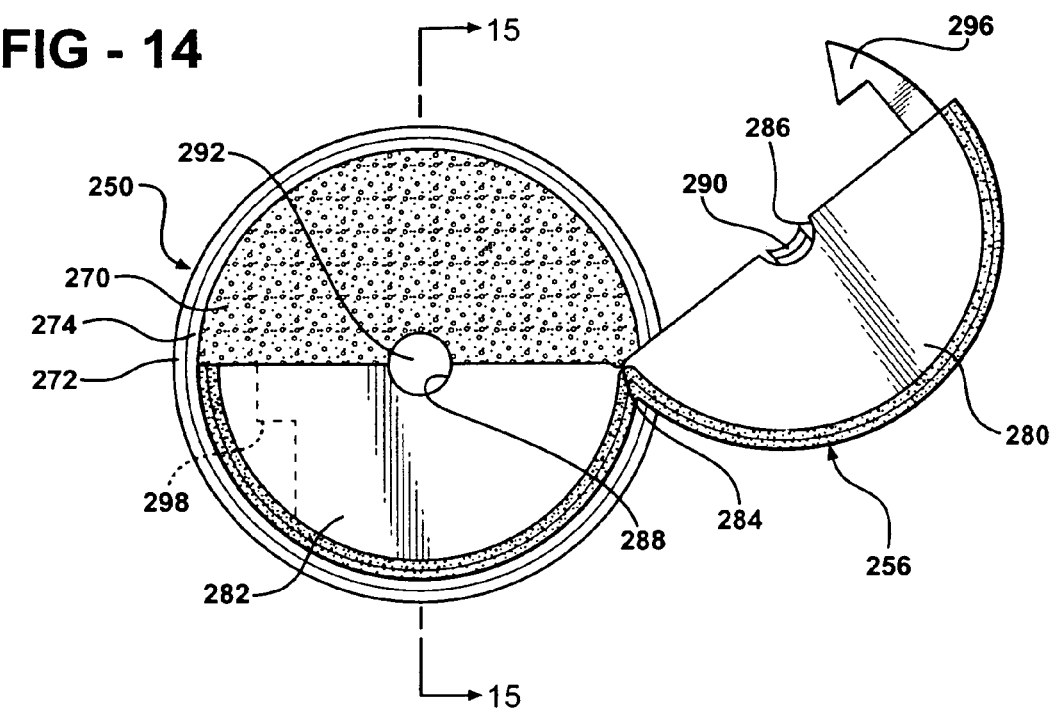
FIG. 14, is an end partial cross-sectional view of a sanding device end connector illustrated in application in FIG. 12, with the inventive sanding device as illustrated in FIG. 15, with the connector in the open position, on an enlarged scale.
Figure 15:
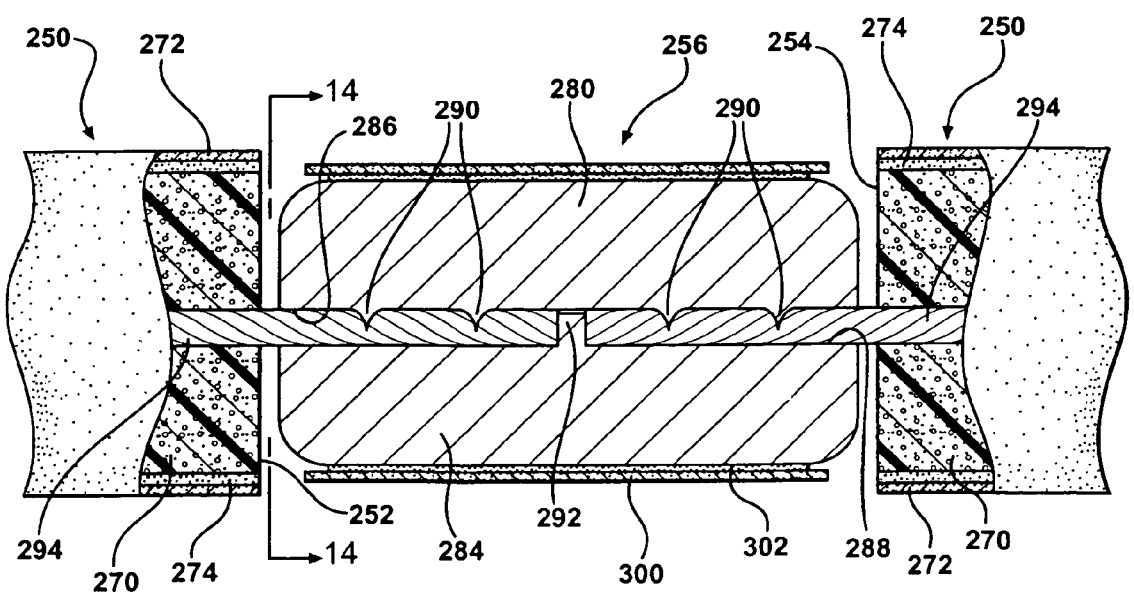
FIG. 15, is a side partial cross-sectional view of the sanding device end connector of FIG. 14, in application, with the connector in the closed position.

Referring to FIGS. 14 and 15, the structural detail and operation of fastener 256 is illustrated. Fastener 256 is a clam shell type design made of injection molded plastic or other suitable material. Fastener 256 is generally cylindrical in shape and comprises upper and lower half portions, 280 and 282, respectively, joined by a living hinge 284. Symmetrically facing, semi-cylindrical upper and lower axial passageways 286 and 288 are centrally formed within fastener 256. Sharpened barbs 290 are integrally formed with upper half portion 280 and extend into upper passageway 286. An axial stop member 292 is integrally formed with lower half portion 282 and extends into lower passageway 288.

In application, ends 252 and 254 of sanding rope 250 define the axially outwardly extending stub ends of an elongated, non-resilient, flexible cord 294 which extends through the center of base portion 270 of sanding rope 250 throughout its entire length. The stub ends of cord 294 are dressed within passageways 296 and 298 from opposite ends of fastener 256 until the stub ends of cord 294 abut each side of stop member 292. Thus positioned, upper and lower half portions 280 and 282 are rotated into the orientation illustrated in FIG. 15, whereby a self-engaging latch arm 296 integrally formed within upper half portion 280 snap-engages a mating engagement surface 298 formed within lower half portion 282. Thus positioned, barbs 290 pierce into cord 294 to affect the closure of the loop 258 (refer FIG. 12) and allow the application of axial tension forces there through.

The outer circumferential surface of fastener 256 is preferably covered by an abrasive layer 300 and an intermediate adhesive layer 302 to enhance the overall sanding effect of the sanding rope 250 when configured in a loop 258.

Referring to FIG. 16, an alternative design fastener 304 is applied to join two opposed ends 306 and 308 of a length of sanding rope 310. As described herein above, sanding rope 310 has an elongated non-resilient, flexible cord 312 axially disposed within a base portion 314 formed of relatively soft, compressible material such as foam or rubber. The outer peripheral surface of base portion 314 is substantially covered by an abrasive layer 316 bonded to base portion 314 by an intermediate adhesive layer 318. Axially spaced circumferential recesses or neck regions 320 define outer abrasive surface regions 322 there between. Ends 306 and 308 of sanding rope 310 have rope stubs 324 and 326, respectively, extending axially there from.

Referring to FIGS. 16 and 17, fastener 304 is formed of two opposed frustu-conical body portions 328 and 330 formed of stamped metal, molded plastic or other suitable material. Body portion 328 is associated with rope end 306, opening rightwardly as viewed in FIG. 16. The small diameter, lefthandmost end of body portion 328 forms an opening 332 to receive rope stub 324. Axially reversed barbs 334 integrally formed with body portion 328 permit rope stub 324 to be manually displaced rightwardly with respect to body portion 328, but check any relative leftward displacement. A knot 336 formed in rope stub 324 provides additional design robustness and ensures against inadvertent release of rope stub 324 from body portion 328 of fastener 304. An axially offset keyhole opening 338 formed in body portion 328 permits knot 336 to be pre-formed and assembled by passing it through keyhole opening 338. A radially outwardly directed circumferential flange 340 is integrally formed at the righthandmost end of body portion 328.

Body portion 328 is assembled with end 306 of sanding rope 310 by the following steps. First, rope stub 324 is dressed axially away from end 306 and through keyhole opening 338. While manually gripping rope stub 324, body portion 328 is oriented concentrically with rope end 306 and pushed leftwardly therein, resiliently deforming the soft base portion 314 until the flange 340 is substantially aligned with rope end 306. Thereafter, rope stub 324 is radially displaced from keyhole 338 into opening 332 and released. The natural resilience of the base portion 314 material will urge body portion 328 rightwardly, thereby causing the barbs 334 to bite into the cord 312. Finally, knot 336 is formed in rope stub 324 with care being taken that the knot 336 is fully disposed within body portion 328.

Body portion 330 is associated with rope end 308, opening leftwardly as viewed in FIG. 16. Body portion 330 is largely a mirror image of body portion 328, including an axial opening 342 in the small diameter righthandmost end thereof. Axially reversed barbs 344 are integrally formed with body portion 330 and permit rope stub 326 to be manually displaced leftwardly with respect to body portion 330 but check any rightward withdrawal of rope stub 326 from opening 342. A knot 346 formed in rope stub 326 provides additional robustness of the design as described herein above. An axially offset keyhole opening (not illustrated) formed in body portion 330 facilitates assembly as described herein above. A radially outwardly directed circumferential flange 348 is integrally formed at the lefthandmost end of body portion 330. Four circumferentially equally spaced snap engagement members 350 extend axially leftwardly from flange 348 and are integrally formed with body portion 330.

Body portion 330 of fastener 304 is assembled with end 308 of sanding rope 310 substantially as described herein above with respect to body portion 328 and end 306, with care being taken to align the flange 348 of body portion 330 with the end 308 of sanding rope 310 and the knot 346 being fully disposed within body portion 330.

A final assembly step involves manual axial alignment of the ends 306 and 308 and axially pressing them together. Insodoing, snap engagement members 350 serve to guide the flange 340 of connector body portion 328 until engagement occurs as illustrated in FIG. 16. The concentric positioning of flanges 340 and 348 ensures precise alignment of the rope ends 306 and 308. Finally, having the flanges 340 and 348 aligned with their respective rope ends 306 and 308, respectively, causes to minimize the resultant axial gap between ends 306 and 308. This configuration results in extremely precise sanding by the sanding rope 310 as well as an aesthetically pleasing appearance, wherein the point of interconnection of sanding rope ends is not apparent.

Referring to FIG. 18, an alternative method of forming sanding rope 352 is illustrated. Rather than co-forming the completed article, as in the case of the embodiment described in connection with FIG. 5 herein above, a resilient foam or rubber base portion 354 is pre-formed with flexible cord 356 disposed therein. A layered composite consisting of an abrasive layer 358, a first adhesive layer 360, a carrier layer 362 and a second adhesive layer 364 is prepared in strip form and adhesively applied to base portion 354 in a spiral orientation extending along axis C-C. Suitable gaps 366 are formed between adjacent edges of the composite overlayment 368. The gaps enhance overall flexibility of sanding rope 352 as do the neck regions 278 of the sanding rope 250 described in connection with FIGS. 12-15 herein above. Although a single strip 368 is illustrated, it is contemplated that two or more parallel stripe could be substituted.

Figure 19:
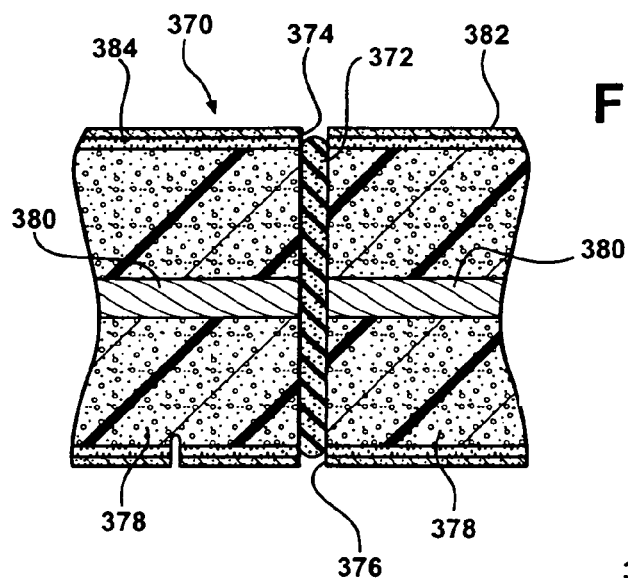
FIG. 19, is a broken cross-sectional view of another embodiment of the invention illustrating the bonding of a length of the sanding into a continuous loop.

Referring to FIG. 19, sanding rope 370 could be formed in a continuous loop without the use of mechanical fasteners 256 and 304 described herein above by substituting a suitable weldment or bond 372 joining opposed ends 374 and 276 of sanding rope 370. It is contemplated that the weldmentfbond would affix the base portions 378, rather than the inner cord 380 or the outer abrasive layer 382 and adhesive layer 384.

Figure 20:
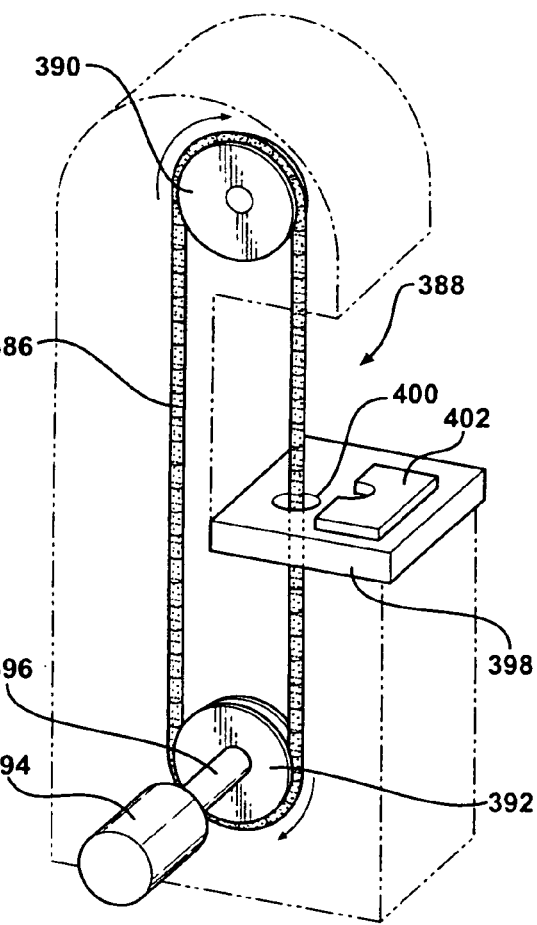
FIG. 20, illustrates the application of a continuous loop of the segmented sanding device as a belt-type sander.

Referring to FIG. 20, the application of a continuous loop of sanding rope 386 constructed in accordance with the teachings herein on a band saw like apparatus 388 is illustrated. Sanding rope 386 is dressed over two vertically spaced pulleys 390 and 392. The upper pulley 390 is mounted to freely rotate about an axis, while the lower pulley 392 is rotated by an electric motor 394 through a suitable drive apparatus 396. A work table 398 is suspended between the pulleys 390 and 392. A clearance hole 400 in work table 398 serves to guide the sanding rope 386 passing downwardly there through. A workpiece 402 can be conveniently manipulated upon the top surface of the work table 398 to perform precise continuous sanding operations. It is contemplated that some form of tensioner or device for adjusting the vertical spacing between pulleys 390 and 392 will be required to avoid undue slack in sanding rope 386.

Figure 21:
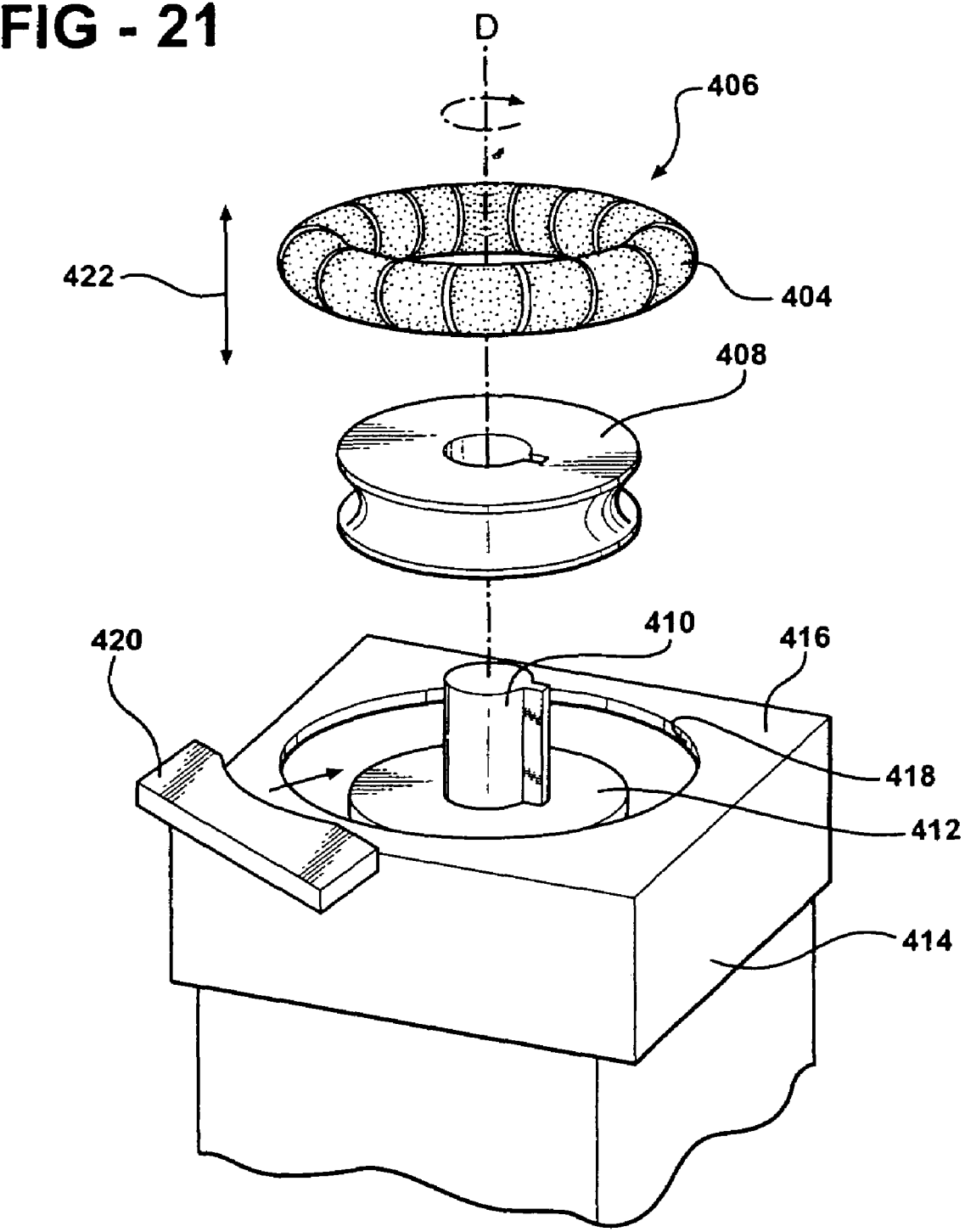
FIG. 21, illustrates the application of a continuous loop of the segmented sanding device as a drum-type sander.

Referring to FIG. 21, the application of a continuous loop of sanding rope 404 constructed in accordance with the teachings herein on a drum table sander like apparatus 406 is illustrated. Sanding rope 404 is mounted on a pulley shaped spindle 408, which, in turn, is carried on an output shaft 410 of an electric motor-transmission drive mechanism 412 for rotation about axis D-D. Motor-transmission drive mechanism 412 is disposed within a housing 414 defining a horizontal work surface 416 on the top surface thereof. The output drive shaft 410 extends upwardly through an opening 418 in the work surface 416 dimensioned to position the spindle and sanding rope 404 vertically adjacent work surface 416. A workpiece 420 can be conveniently manipulated upon work surface 416 of sander apparatus 406 to perform precise continuous sanding operations. Sander apparatus 406 can be of the type which maintains the spindle 408 and sanding rope 404 at a fixed vertical orientation with respect to the work surface 416 as it rotates about axis D-D or, alternatively, of the type that selectively axially reciprocates the spindle 408 and sanding rope 404 through a range of motion reflected by arrow 422.

Figure 22:
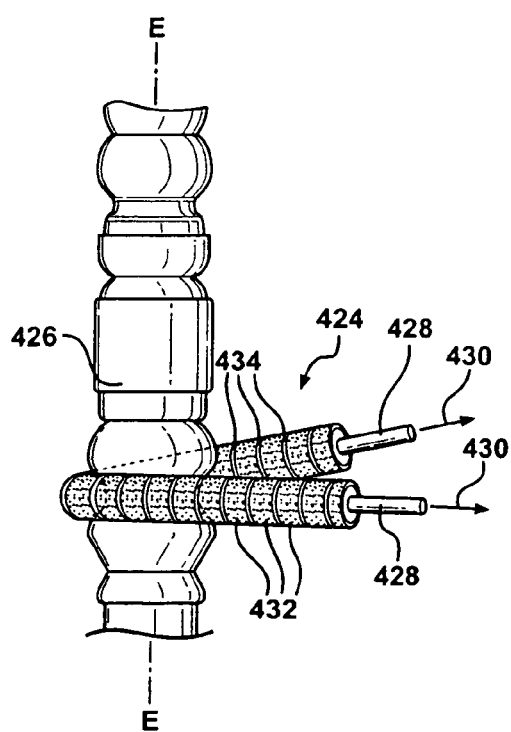
FIG. 22, illustrates the hand application of a length of the segmented sanding on a work piece.

Referring to FIG. 22, a sanding rope 424 is illustrated in application with a workpiece such as a furniture baluster 426. It is contemplated that the invention is best applied with extremely irregular contoured surfaces. Sanding rope 424 is applied by draping it over a surface contour of the baluster 426 requiring sanding with cords 428 oriented in a generally parallel orientation normal to the axis E-E of the baluster 426. Cords 428 serve as grip handles, which are alternately pulled rightwardly, as illustrated by arrows 430. As described hereinabove, the user will maintain continuous tension in cord 428 throughout the sanding process. For this type of application, it is contemplated that the sanding rope 424 will be of relatively small overall diameter and define a large number of discrete abrasive surface regions 432 interspaced by neck regions 434 to ensure maximum flexibility.

It is to be understood that the invention has been described with reference to specific embodiments and variations to provide the features and advantages previously described and that the embodiments are susceptible of modification as will be apparent to those skilled in the art. For example, any number of characteristic cross-sectional configurations of the inventive sanding rope can be employed for various applications.

Furthermore, it is contemplated that many alternative common inexpensive materials can be employed to construct the rope core, abrasive coating and string reinforcement. For example, abrasive coating can be applied in a powdered, granular or preformed sheet form. Accordingly, the forgoing is not to be construed in a limiting sense.

The invention has been described in an illustrative manner. and it is to be understood that the terminology which has been used is intended to be in the nature of words of description rather than of limitation. Where in the forgoing description reference has been made to ratios, integers or components having known equivalents, then such equivalents are herein incorporated as if individually set forth.

Obviously, many modifications and variations of the present invention are possible in light of the above teachings. It is, therefore, to be understood that within the scope of the appended claim wherein reference numerals are merely for illustrative purposes and convenience and are not to be in any way limiting, the invention, which is defined by the following claims as interpreted according to the principles of patent law, including the Doctrine of Equivalents, may be practiced otherwise than as specifically described.

What is claimed is:

1. A method of applying a disposable hand sanding device in sanding curvilinear surfaces of a work piece comprising the steps of:

forming said sanding device with an elongated, generally rod shaped base portion constructed of lightweight resilient foam material having a substantially constant cross-section along a characteristic line of elongation and a flexible abrasive surface formed on an external surface of the rod base portion;

manually gripping an outer surface of said sanding device and positioning said device adjacent said work piece;

conforming the shape of the base portion and overlaying abrasive surface of said device to an oblique contour of said work piece by manually applying loading of the sanding device against the work piece; and thereafter selectively reciprocally displacing said sanding device with respect to said work piece to effect sliding engagement of the abrasive surface of the sanding device against the oblique contour of the work piece to effect selective removal of material from said work piece.

2. The method of applying a disposable hand sanding device of claim 1, wherein said lightweight resilient foam material comprises constant diameter extruded foam.

3. The method of applying a disposable hand sanding device of claim 1, wherein said lightweight resilient foam material comprises closed cell foam.

4. The method of applying a disposable hand sanding device of claim 1, further comprising the step of forming said sanding device wherein portions of said rod shaped base portion are not covered by an abrasive surface to form hand gripping surfaces.

5. The method of applying a disposable hand sanding device of claim 4, wherein hand gripping surfaces are formed adjacent opposed ends of said hand sanding device.

6. The method of applying a disposable hand sanding device of claim 1, wherein the shape of the base portion and overlaying abrasive surface is conformed to the oblique contour of the work piece by the application of uni-directional axially applied manual loading.

7. The method of applying a disposable hand sanding device of claim 1, wherein the shape of the base portion and overlaying abrasive surface is conformed to the oblique contour of the work piece by the application of bi-directional axially applied manual loading.

8. The method of applying a disposable hand sanding device of claim 1, wherein the shape of the base portion and overlaying abrasive surface is conformed to the oblique contour of the work piece by the application of radially applied manual loading.

9. The method of applying a disposable hand sanding device of claim 1, wherein the shape of the base portion and overlaying abrasive surface is conformed to the oblique contour of the work piece by the application of a combination of axially and radially applied manual loading.

* * * * *